US012331569B2

(12) United States Patent
Campos et al.

(10) Patent No.: US 12,331,569 B2
(45) Date of Patent: Jun. 17, 2025

(54) SYSTEMS AND METHODS OF ONE OR MORE LATCH BRACKETS

(71) Applicant: Toshiba International Corporation, Houston, TX (US)

(72) Inventors: Walter Campos, Houston, TX (US); Enrique Martinez, Houston, TX (US); Michael C. Daskalos, Magnolia, TX (US)

(73) Assignee: Toshiba International Corporation, Houston, TX (US)

( * ) Notice: Subject to any disclaimer, the term of this patent is extended or adjusted under 35 U.S.C. 154(b) by 530 days.

(21) Appl. No.: 17/484,118

(22) Filed: Sep. 24, 2021

(65) Prior Publication Data

US 2023/0096171 A1 Mar. 30, 2023

(51) Int. Cl.
*E05C 9/18* (2006.01)
*E05B 17/20* (2006.01)
*H02B 1/38* (2006.01)

(52) U.S. Cl.
CPC ........ *E05C 9/1875* (2013.01); *E05B 17/2088* (2013.01); *E05C 9/1808* (2013.01); *H02B 1/38* (2013.01); *E05Y 2900/208* (2013.01)

(58) Field of Classification Search
CPC ....... E05C 9/1875; E05C 9/1808; H02B 1/38; E05Y 2900/208; E05B 17/2088
USPC .............................................. 312/326, 265.6
See application file for complete search history.

(56) References Cited

U.S. PATENT DOCUMENTS

| | | | | |
|---|---|---|---|---|
| 624,715 | A * | 5/1899 | Wenz | F16L 45/00 138/92 |
| 2,522,964 | A * | 9/1950 | Rowe | H02B 1/38 220/849 |
| 2,758,625 | A * | 8/1956 | Ougljesa | F16B 5/02 411/964 |
| 2,991,816 | A * | 7/1961 | Harbison | F16B 31/02 411/965 |
| 3,289,726 | A * | 12/1966 | Sauter | F16B 5/0208 37/459 |
| 3,294,140 | A * | 12/1966 | Cosenza | F16B 5/0208 411/953 |
| 3,503,431 | A * | 3/1970 | Whiteside | F16B 41/002 411/353 |
| 3,666,134 | A * | 5/1972 | Rauch | H05K 7/1427 292/256.75 |
| 4,125,140 | A * | 11/1978 | Basile | F16B 21/16 411/105 |
| 5,855,052 | A * | 1/1999 | Becker | F16B 5/0208 29/243.519 |
| 6,508,471 | B1 * | 1/2003 | Blau | F16J 15/064 277/313 |
| 8,023,271 | B2 * | 9/2011 | Arlotta | H02G 3/088 361/752 |
| 9,657,782 | B2 * | 5/2017 | Nicholas | F16D 3/387 |

(Continued)

Primary Examiner — Daniel J Troy
Assistant Examiner — Timothy M Ayres
(74) Attorney, Agent, or Firm — Baker Botts L.L.P.

(57) ABSTRACT

A cabinet including a door, a fastener, and a latch bracket is provided. The fastener is extending at least partially through an aperture in the door. The latch bracket is located on an internal surface of a door frame to secure the door to the door frame. A retainer washer is disposed around the fastener and disposed between the latch bracket and the door in order to retain the fastener when in a disengaged position.

14 Claims, 9 Drawing Sheets

(56) References Cited

U.S. PATENT DOCUMENTS 9,899,808 B2 * 2/2018 Sipe .................. H05K 5/03
10,498,114 B1 12/2019 Campos et al.

* cited by examiner

SYSTEMS AND METHODS OF ONE OR MORE LATCH BRACKETS

TECHNICAL FIELD

Embodiments of the present disclosure relate to door fastening systems and, more particularly, to systems and methods of one or more latch brackets.

BACKGROUND

Medium-voltage (e.g., greater than 1500 volts) power equipment, such as motor control centers and adjustable speed drives, often use groups of power components used for energizing or operating loads. These components are housed in an enclosure that is sealed via a locking door. Arc faults, where a high amount of electricity is discharged between conductors, can sometimes occur within these enclosures. These arc faults lead to a large amount of heat and pressure rise within the sealed enclosure. It is desirable for the enclosure to remain sealed throughout such an arc event, to contain any large blast.

Doors used to seal these enclosures are often equipped with a latching system used to close and lock the door. Door fasteners are used in a wide variety of contexts in which the door (which may be a hinged door or a removable cover) is repeatedly opened and closed. Door fasteners may be used to secure the door against a mounting or contact surface when the door is closed. Such door fasteners may in some instances include one or more bolts that are extended into locking engagement with a corresponding nut on an opposite side of the mounting surface onto which the door is closed. For doors that will be repeatedly opened, closed, and secured via fasteners, it may be desirable to retain the door fastening hardware against the door even while the door is not fastened (e.g., while the door is open). However, retaining equipment often does not allow for a door to close completely flush against the mounting surface. Some doors are required to close flush against their mounting surfaces to provide protection from the effects of an internal arc fault.

It is now recognized that a need exists for a retaining assembly that can be used to retain door fastening hardware on a door that must sit flush against the mounting surface when closed.

SUMMARY

In accordance with an aspect of the present disclosure, a power equipment cabinet comprises a door operable to provide access within the cabinet and one or more sets of fasteners coupled to the door, wherein each of the one or more sets of fasteners comprises a bolt and a retainer washer. The cabinet further comprises one or more latch brackets disposed on an internal surface of a door frame of the power equipment cabinet operable to secure the door to the door frame. Each of the one or more latch brackets comprises a housing, an engagement aperture operable to receive the bolt, and a recessed aperture operable to receive the retainer washer. The recessed aperture is disposed at a front surface of each latch bracket and extends towards a back surface of the housing, wherein the engagement aperture is disposed adjacent to the recessed aperture opposite to the front surface of the housing and extends towards the back surface of the housing.

In accordance with another aspect of the present disclosure, a method includes receiving a fastener from a set of fasteners into a latch bracket disposed on an internal surface of a door frame in an engaged position, the latch bracket comprising an engagement aperture and a recessed aperture. The method further includes securing a door to the door frame via the fastener, and retaining the fastener to the door via the set of fasteners attached to the door during a disengaged position.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Illustrative embodiments of the present disclosure are described in detail herein. In the interest of clarity, not all features of an actual implementation are described in this specification. It will of course be appreciated that in the development of any such actual embodiment, numerous implementation specific decisions must be made to achieve developers' specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of the present disclosure. Furthermore, in no way should the following examples be read to limit, or define, the scope of the disclosure.

Disclosed embodiments are directed to a latch bracket and a system and method for using the same. The latch bracket provides a simple method for retaining door fastening hardware to doors that are designed to sit flush against the door's contact surface when the door is closed. Retainer washers are commonly used to retain fastening hardware on covers. However, the retainer washers are typically installed on the inside of the cover so that the retainer washer takes up space between the cover and its contact surface. As such, this type of assembly involving a retainer washer cannot be used for doors that require the door surface to be flush with the contact surface. The disclosed embodiments address the shortcomings of existing retainer washer assemblies.

The disclosed embodiments provide a latch bracket that can be used to retain fastening hardware to a door having a surface that is flush with the door's contact surface. This is the case for doors (including hinged doors or covers) that sit on the same surface as their door frame or contact surface to meet product standards. When the surface of the door has to directly contact the contact surface, there is no space for a retainer washer between the door and the contact surface. The disclosed latch bracket, system, and method enable a retainer washer to be used for retaining a fastener on the door in door assemblies in which the door, when closed, sits flush with the contact surface. It should be noted, however, that the disclosed latch bracket, system, and method may be utilized with any door designed to be opened or closed over a contact surface, regardless of whether the door sits flush against the contact surface when closed.

Figure 1:
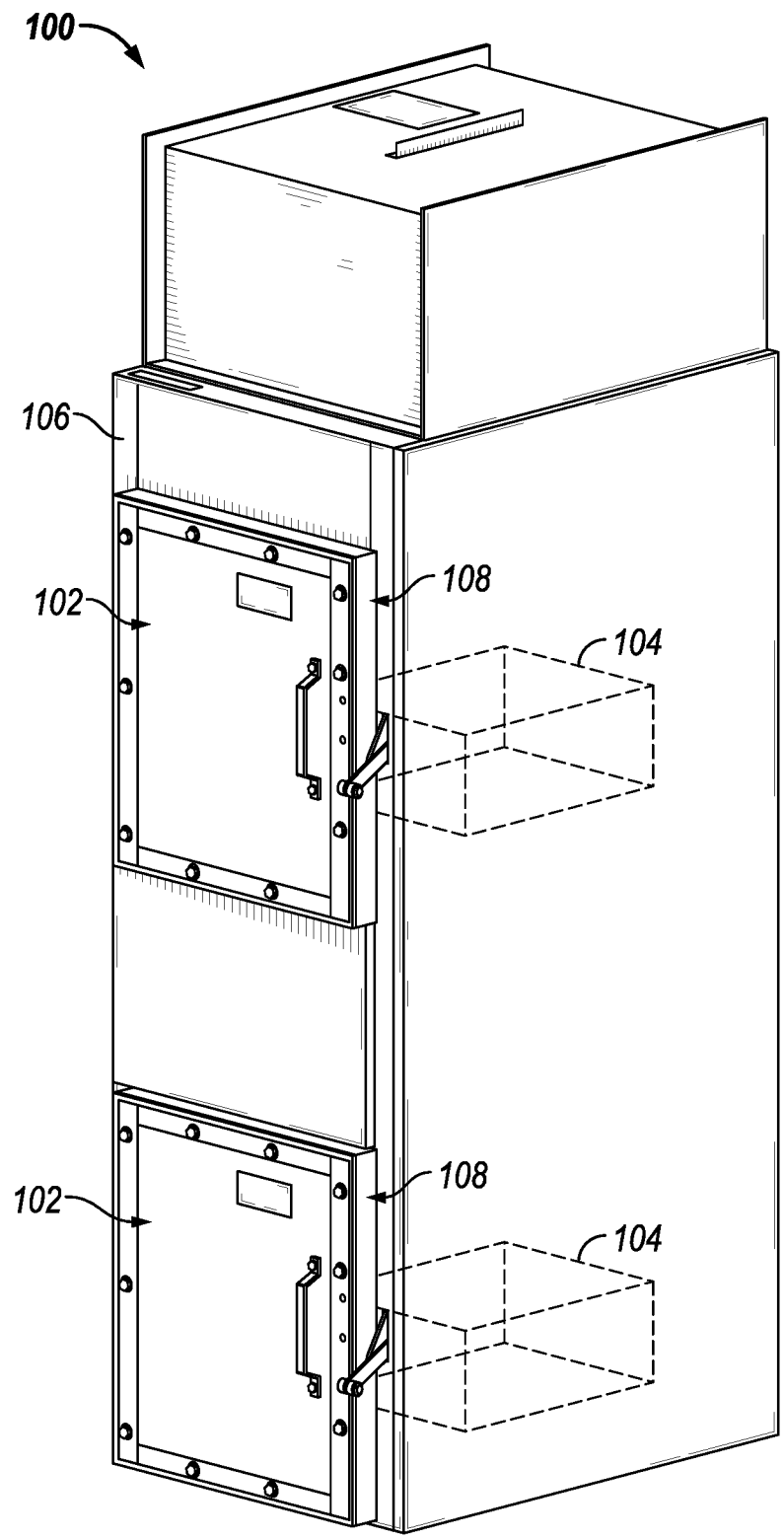
FIG. 1 is a perspective view of a power equipment cabinet, in accordance with an embodiment of the present disclosure.

Turning now to the drawings, FIG. 1 illustrates a power equipment cabinet 100 or cubicle that may utilize the one or more latch brackets. The cabinet 100 may be any desired structure that utilizes a door 102. In some embodiments, the cabinet 100 may be an enclosure designed to house components therein. In embodiments, the cabinet 100 may be an enclosure designed to prevent ingress or egress of fluids and/or debris relative to the interior of the enclosure. In some embodiments, the cabinet 100 may be an enclosure designed to be arc resistant. In such instances, the door 102 may be designed to prevent effects from an arc inside the cabinet 100 from breaching the cabinet 100, for example, by blasting open the door 102.

In one or more embodiments, the cabinet 100 is an enclosure for various power devices, which may form part of, for example, a medium-voltage control center or adjustable speed drive. The power components enclosed in the cabinet 100 may be used for various other functions as well. The illustrated cabinet 100 includes two doors 102 for accessing the enclosed power components 104. These doors 102 may open into separate compartments within the cabinet 100, each compartment enclosing its own power components 104 therein. In other embodiments, the doors 102 may open into the same compartment within the cabinet 100. As shown, the doors 102 may each be generally rectangular in shape.

It should be understood by those of ordinary skill in the art that any desired number of doors 102 may be used within a power equipment enclosure such as the cabinet 100 of FIG. 1, and the disclosure is not limited to cabinetry featuring any exact number of doors 102 formed therein. Other embodiments of power equipment cabinetry utilizing the disclosed latch bracket fastener retaining assembly may include, for example, one, three, four, five, six, seven, eight, or more doors 102.

Regardless of the number of doors 102 and/or compartments within the cabinet 100, each door 102 includes one or more assemblies of latch brackets, in accordance with embodiments of the present disclosure. Each latch bracket may be located on a back side or interior portion of the door 102, which cannot be seen in the illustration of FIG. 1.

In FIG. 1, both doors 102 are shown in a closed position. In this closed position, the door 102 blocks an opening formed in an outer housing 106 of the cabinet 100. The outer housing 106 includes a door frame 108 to which the door 102 may be latched after it is closed. The door frame 108 may extend slightly outward from the rest of the outer housing 106 to engage with the door 102. In one or more embodiments, a portion of the components of each latch bracket fastener retaining assembly may be disposed within the door frame 108 of each door 102.

Figure 2:
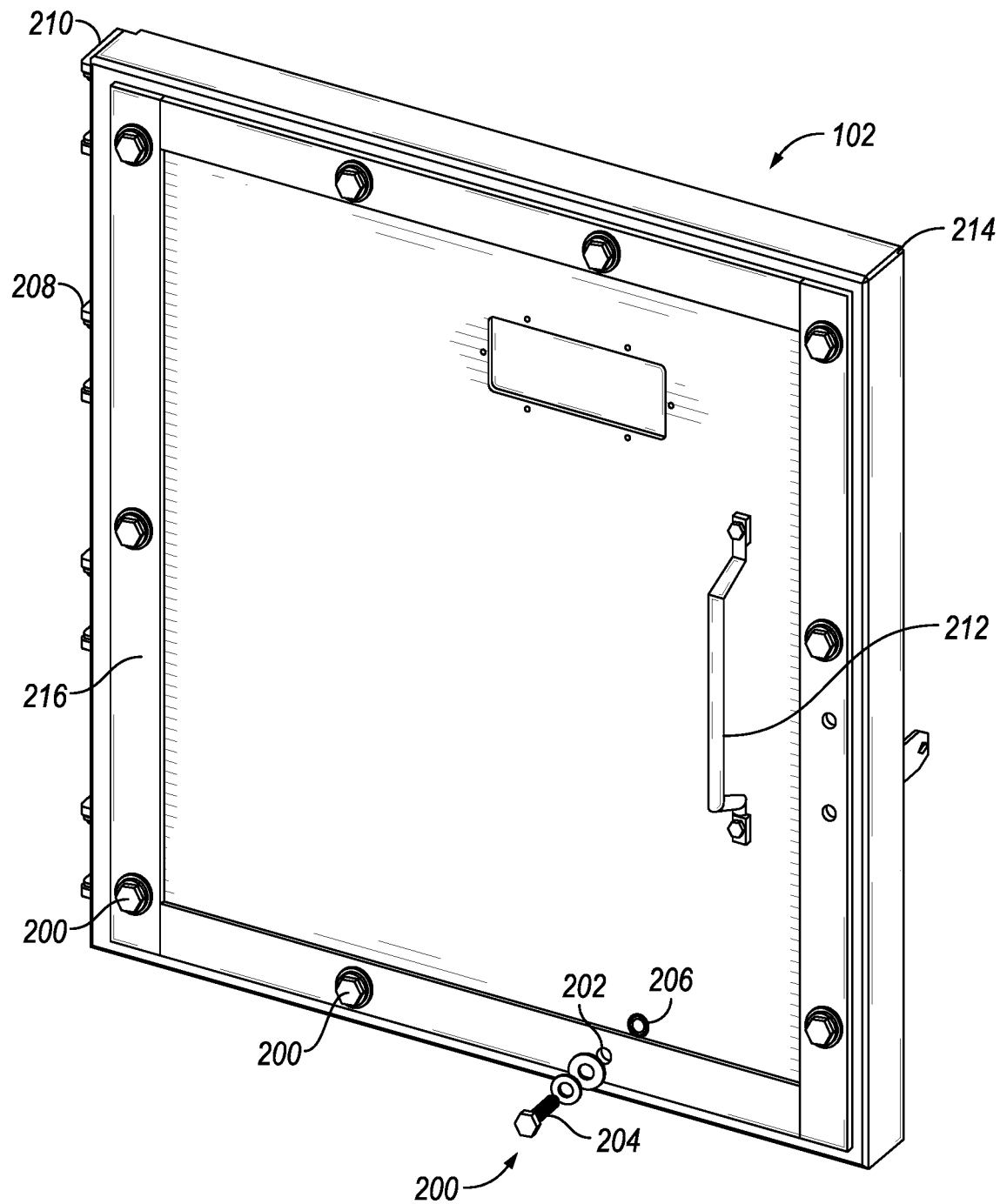
FIG. 2 is a view of a door of the cabinet of FIG. 1, in accordance with an embodiment of the present disclosure.

FIG. 2 illustrates the door 102 equipped with one or more sets of fasteners 200 to be utilized with one or more latch brackets disposed within the door frame 108, in accordance with aspects of the present disclosure. Each set of fasteners 200 may extend at least partially through an aperture 202 in the door 102. As discussed further below, each set of fasteners 200 may generally comprise a bolt 204 and a retainer washer 206, wherein the retainer washer 206 is disposed around the bolt 204 and disposed at an interior portion of the door 102 between a latch bracket (for example, latch bracket 600 in FIG. 6) and the door 102. Each one or more sets of fasteners 200 may be attached to the door 102, wherein the retainer washer 206 may retain the remaining components of the set of fasteners 200 to the door 102.

Each one or more sets of fasteners 200, when activated, generally fastens and/or secures the closed door 102 to the door frame 108 (referring to FIG. 1). The door frame 108 may surround the opening in the cabinet 100 (referring to FIG. 1) that is selectively covered by the door 102. In embodiments, the door 102 may have a larger area than the opening over which the door 102 is closed. As such, the perimeter edges of the door 102 may overlap the opening in the cabinet 100 and be disposed over the door frame 108. When closed, a flat edge (not shown) located on the door frame 108 may contact directly (in direct contact) with a gasket between the door 102 and door frame 108.

In an example, the door 102 may be a hinged door rotatably attached to the cabinet 100 via a hinge 208, as illustrated. There may be one or more hinges 208 disposed at a first side 210 of the door 102 to couple the door 102 to the cabinet 100. In another example, the door 102 may be a removable cover that can be selectively removed from the cabinet 100. In such instances, the door 102 may not feature a hinge. In general, the door 102 is selectively moveable with respect to the cabinet 100 to provide an access point to an interior of the cabinet 100.

In an example, the door 102 may include an outward facing door handle 212, as shown in FIG. 1. As illustrated, the door handle 212 may be disposed on the door 102 near a second side 214 of the door 102 opposite to the first side 210. In embodiments, an operator may grip the door handle 212 and open the door 102, wherein the door 102 may rotate via the hinges 208 along the first side 210 of the door 102.

The door 102 may be opened and closed relative to the cabinet 100 via its connection at the hinge 208. When the door 102 is closed over the opening in the cabinet 100, the door 102 may then be locked via activation of the one or more sets of fasteners 200, which interface with the latch brackets within the door frame 108. When the door 102 is to be opened, the operator may turn the one or more sets of fasteners 200 to disengage the one or more sets of fasteners 200 from the door frame 108 when the door is in the closed position. From there, the door 102 may be opened by either rotation with respect to the cabinet 100 via the hinge 208 or manual removal of the door 102 (as a cover) from the cabinet 100. As the door 102 is opened, each retainer washer 206 may retain the one or more sets of fasteners 200 to the door 102.

As illustrated, each of the one or more sets of fasteners 200 may be disposed along or proximate an outer perimeter of the door 102. That way, the one or more sets of fasteners 200 are able to selectively secure the door 102 against the door frame 108 to which the opposite side of the door 102 is contacted. When multiple sets of fasteners 200 are present on the door 102, the sets of fasteners 200 may be approximately evenly spaced about the perimeter of the door 102. In an embodiment where the door 102 is rectangular in shape, at least one set of fasteners 200 may be disposed along each edge of the four edges of the door 102. The door 102 may be equipped with any desired number of one or more sets of fasteners 200 from as few as one to as many as 50 or more.

As shown in FIG. 2, one or more reinforcement structures 216 may be disposed along or proximate an outer perimeter of the door 102. In embodiments, the one or more sets of fasteners 200 may be operable to secure and couple each of the one or more reinforcement structures 216 to the door 102. Each of the one or more reinforcement structures 216 may be any suitable size, height, shape, and any combinations thereof. Without limitations, the one or more reinforcement structures 216 may comprise any suitable material, such as metals, nonmetals, composites, polymers, ceramics, and any combinations thereof. The one or more reinforcement structures 216 may be configured to reinforce the door 102 from the exterior of the cabinet 100 in the event of an arc fault. The one or more reinforcement structures 216 may be further operable to distribute the local forces applied to the door 102 at the locations of the one or more sets of fasteners 200 when the one or more sets of fasteners 200 are actuated to secure the door 102 to the door frame 108.

Figure 3:
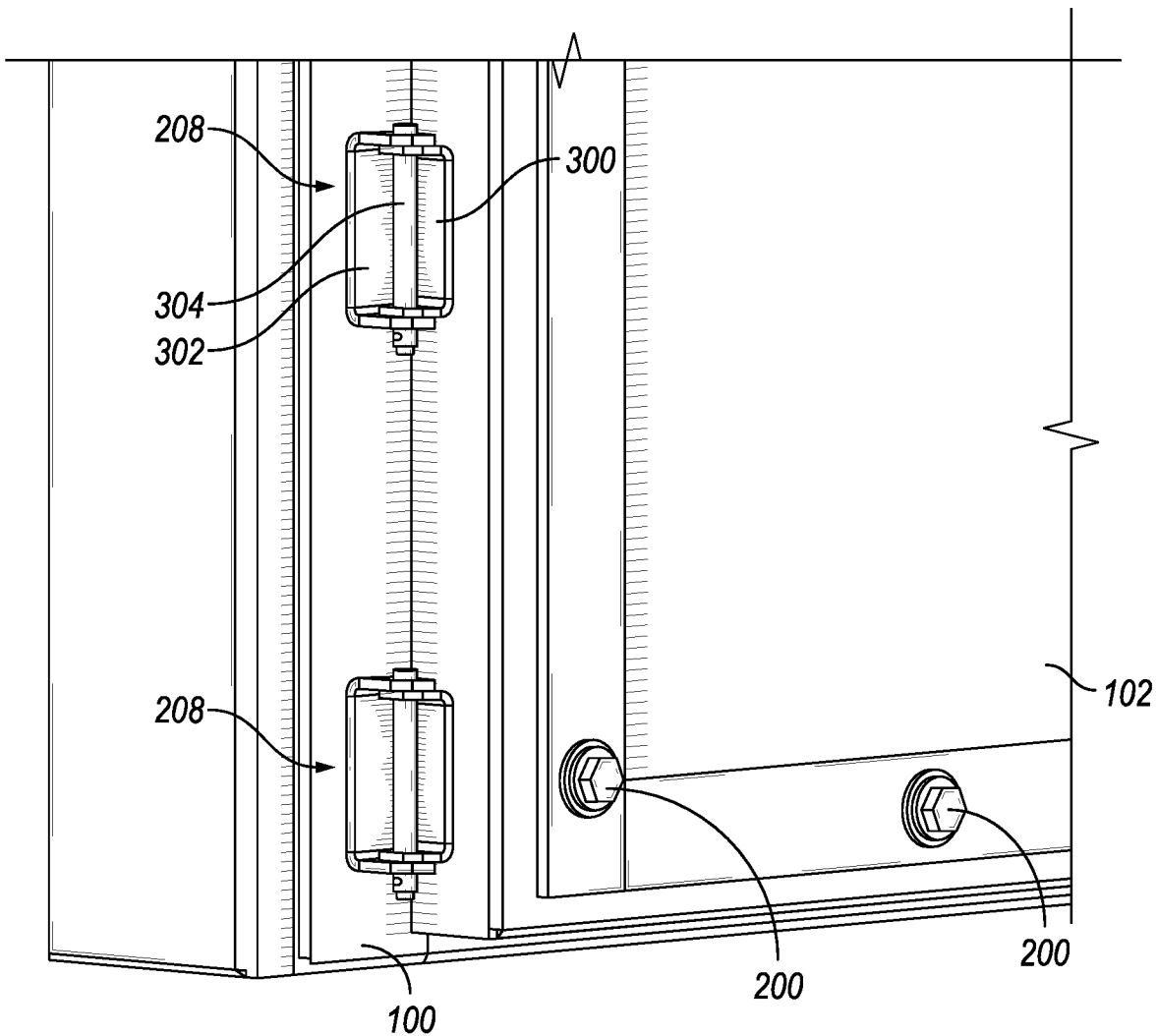
FIG. 3 is a partial view of the door of FIG. 1, in accordance with an embodiment of the present disclosure.
Figure 4B:
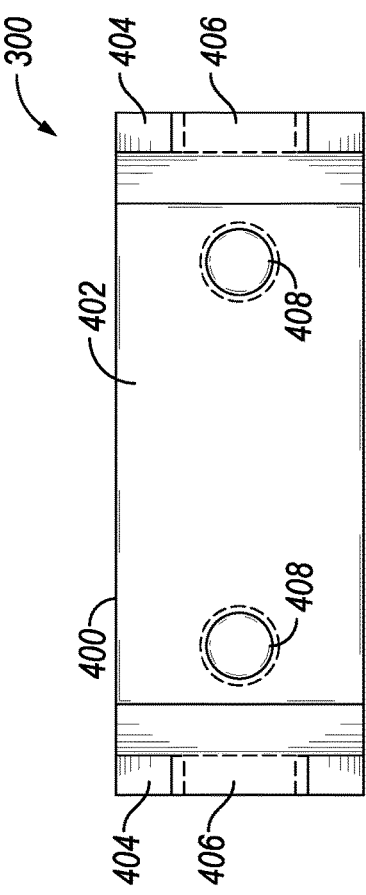
FIGS. 4A, 4B, 4C, and 4D are perspective, top, front, and side views, respectively, of a first hinge component used in the system of FIG. 1, in accordance with an embodiment of the present disclosure.
Figure 4D:
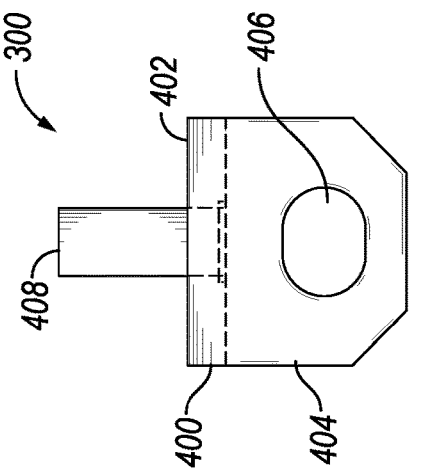
Figure 4A:
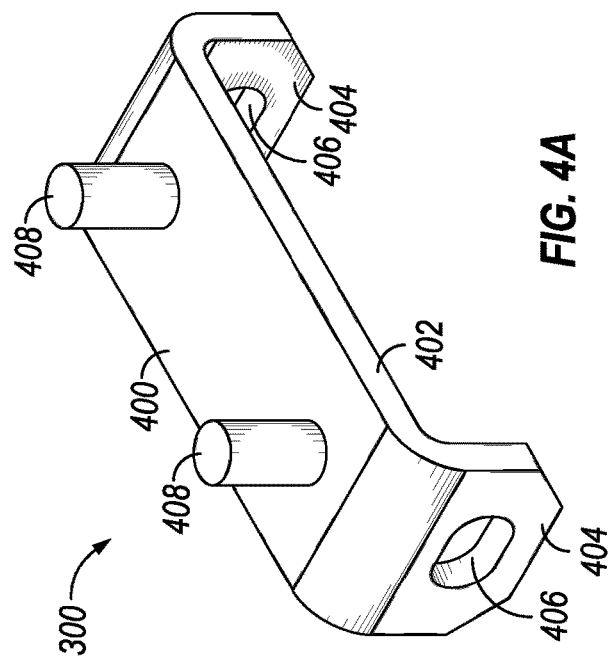
Figure 4C:
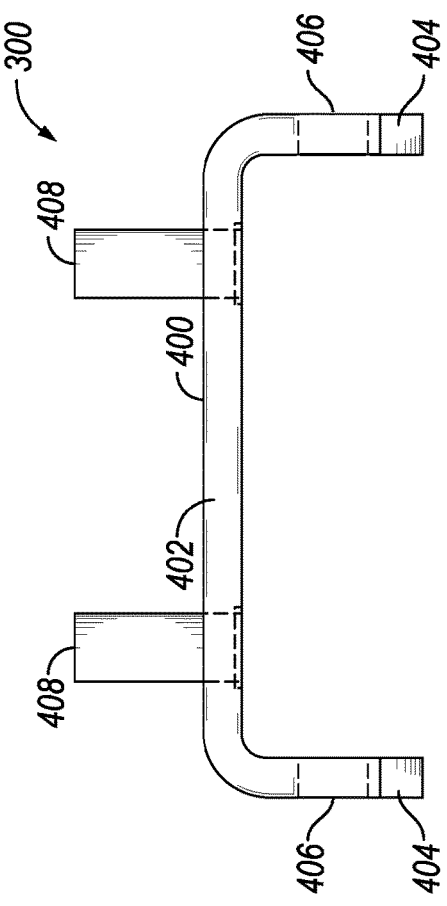
Figure 5B:
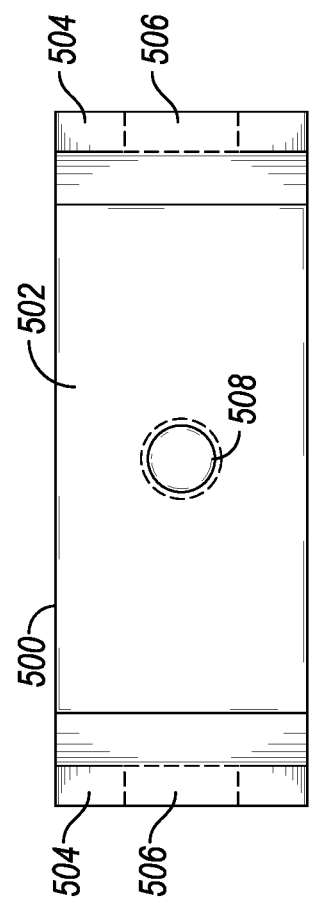
FIGS. 5A, 5B, 5C, and 5D are perspective, top, front, and side views, respectively, of a second hinge component used in the system of FIG. 1, in accordance with an embodiment of the present disclosure.
Figure 5D:
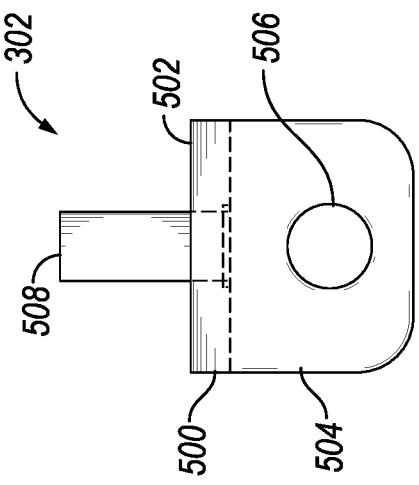
Figure 5A:
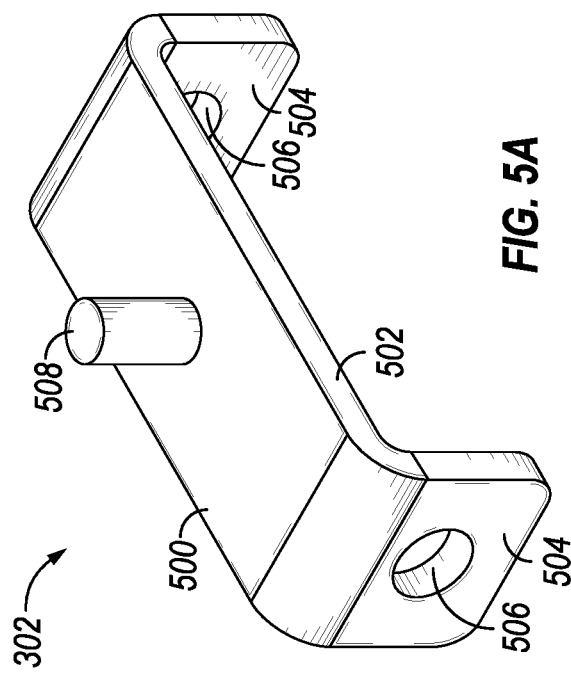
Figure 5C:
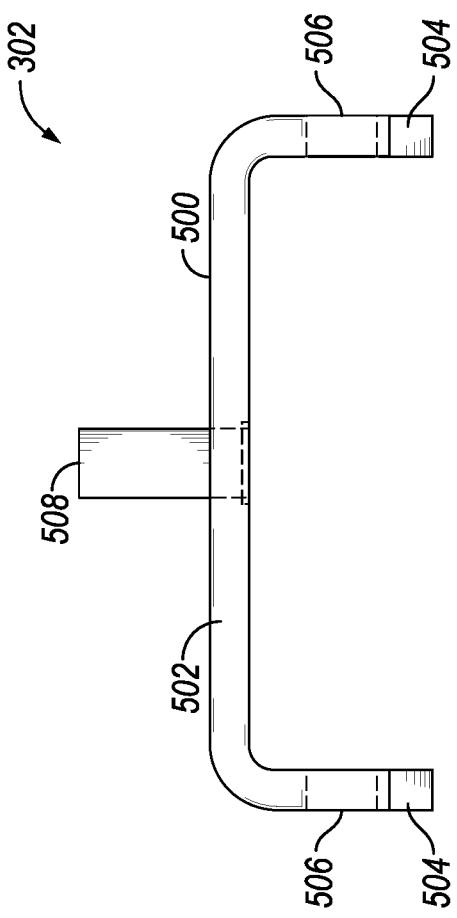

FIG. 3 illustrates the door 102 equipped with the one or more hinges 208, in accordance with aspects of the present disclosure. At least one hinge 208 may generally couple the door 102 to the cabinet 100. In the illustrated embodiment, the door 102 comprises multiple individual hinge 208 coupled between the door 102 and the cabinet 100. An embodiment of the different components in each hinge 208 is described in detail below with reference to FIGS. 4A-5D. In some embodiments, the door 102 may be rotatably coupled to the cabinet 100 via any desired number of (e.g., one, two, three, four, five, six, seven, eight, or more) hinges 208 disposed along the same side of the door 102.

Each hinge 208 may be specially designed to provide even sealing of an internal gasket between the door 102 and the door frame 108 (referring to FIG. 1). For example, each hinge 208 may be a slotted hinge assembly having two parts, a first hinge component 300 attached directly to the door 102 and a second hinge component 302 attached directly to the cabinet 100 to which the door 102 is coupled. FIGS. 4A-5D provide detailed views of these two components 300/302 of the hinge 208 of FIGS. 2-3. FIGS. 4A-4D illustrate the first hinge component 300, while FIGS. 5A-5D illustrate the second hinge component 302.

The first hinge component 300 of FIGS. 4A-4D may include a U-shaped body 400 having an elongated planar middle 402 and two planar tabs 404 extending from opposite ends of the planar middle 402. The tabs 404 are both oriented in parallel planes to each other and oriented 90 degrees from the planar middle 402. The planar tabs 404 may each have an aperture 406 formed therethrough. The apertures 406 are aligned with one another in a direction parallel to the length of the planar middle 402. As illustrated, the apertures 406 may be elliptical or oval in shape. In other embodiments, the apertures 406 may be circular or any other desired shape that enables a rod or similar mechanical linkage to extend therethrough. As illustrated, the planar middle 402 may include one or more fasteners 408 (e.g., studs) extending therefrom to enable coupling of the first hinge component 300 to the door (e.g., 102 of FIGS. 1-3). In the illustrated embodiment, the first hinge component 300 has two fasteners 408, although other numbers and arrangements of fasteners may be used. As illustrated, the fasteners 408 may extend from the planar middle 402 in a direction opposite of the direction in which the planar tabs 404 extend from the planar middle 402. The planar middle 402 of the first hinge component 300 may be disposed in direct engagement with a flat surface on an outside of the door (e.g., 102 of FIG. 3) via the fastener(s) 408 or using any other desired coupling method. The first hinge component 300 may be coupled to a first side 210 (referring to FIG. 2) of the door 102 extending outward from the first side 210 of the door 102.

The second hinge component 302 of FIGS. 5A-5D may similarly include a U-shaped body 500 having an elongated planar middle 502 and two planar tabs 504 extending from opposite ends of the planar middle 502. The tabs 504 are both oriented in parallel planes to each other and oriented 90 degrees from the planar middle 502. The planar tabs 504 may each have an aperture 506 formed therethrough. The apertures 506 are aligned with one another in a direction parallel to the length of the planar middle 502. As illustrated, the apertures 506 may be circular. In other embodiments, the apertures 506 may be elliptical or any other desired shape that enables a rod or similar mechanical linkage to extend therethrough. As illustrated, the planar middle 502 may include one or more fasteners 508 (e.g., studs) extending therefrom to enable coupling of the second hinge component 302 to the cabinet 100 (referring to FIG. 3). As illustrated, the fastener 508 may extend from the planar middle 502 in a direction opposite of the direction in which the planar tabs 504 extend from the planar middle 502. The planar middle 502 of the second hinge component 302 may be disposed in direct engagement with a flat surface on an outside of the contact surface of cabinet 100 via the fastener(s) 508 or using any other desired coupling method.

As shown in FIG. 3, each hinge 208 may include a rod 304 or other mechanical linkage that extends through all four apertures 406/506 of the hinge components 300/302. The multiple hinges 208 may each include their own rod 304, as shown, or the same rod or other mechanical linkage may extend through all of the hinges 208. As illustrated in FIG. 3, the length of the planar middle 502 of the second hinge component 302 may be greater than the length of the planar middle 402 of the first hinge component 300. This enables the first hinge component 300 to slot into the second hinge component 302. In other embodiments, this may be reversed such that the planar middle 402 of the first hinge component 300 is longer than the planar middle 502 of the second hinge component 302 and the second hinge component 302 slots into the first hinge component 300.

The non-circular shape of the apertures 406 in the first hinge component 300 may enable the hinge component 300 to easily rotate with respect to the rod 304 along with the door 102 as the door 102 is opened or closed. With the door 102 in a closed position, the non-circular shape of the apertures 406 may allow the door 102 to move further in an inward direction with respect to the hinges 208 and the cabinet 100 as one or more sets of fasteners 200 are tightened to secure the door 102 against the cabinet 100. This may also help to apply a desired compression to the gasket (for example, gasket 902 in FIG. 9) between the door 102 and door frame 108 (referring to FIG. 1) as the door 102 is compressed through the one or more sets of fasteners 200. Other arrangements of the hinges 208 may be used in other embodiments.

Having described an assembly in which the disclosed one or more sets of fasteners 200 may be used with the door 102, a more detailed description will now be provided of the latch brackets used to secure the door 102 to the door frame 108.

Figure 6:
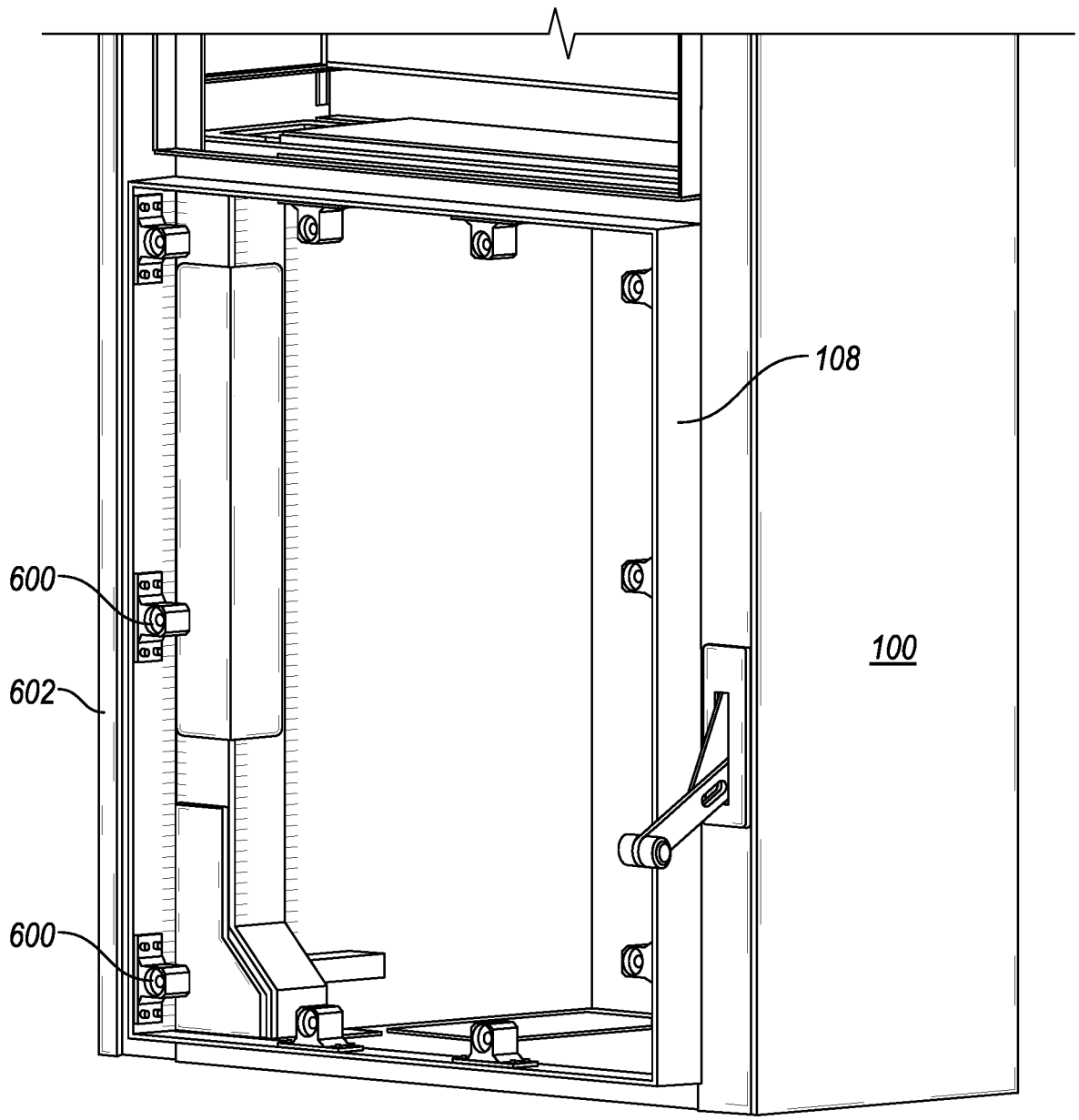
FIG. 6 is a view of the interior of the cabinet of FIG. 1, in accordance with an embodiment of the present disclosure.
Figure 7B:
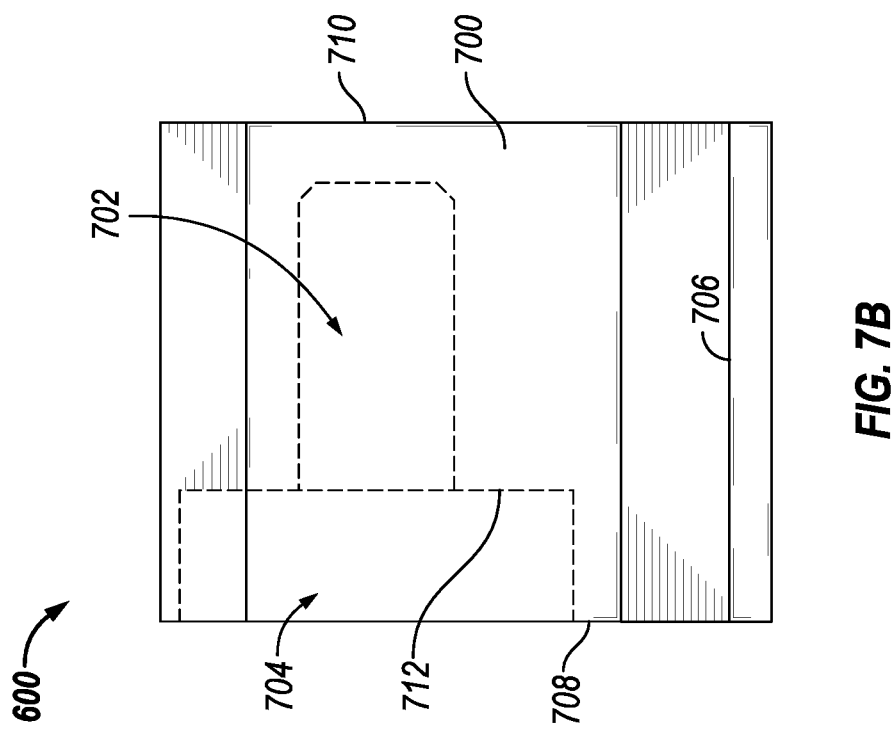
FIGS. 7A and 7B are views of a latch bracket used in FIG. 6, in accordance with an embodiment of the present disclosure.

FIGS. 6-7B illustrate an example of the disclosed one or more latch brackets that may be utilized to retain the door 102 to the door frame 108.

FIG. 6 illustrates the door frame 108 of the cabinet 100, in accordance with an embodiment of the present disclosure. In the illustrated embodiment, the front surface of the door 102 (referring to FIG. 1) is removed so that the interior is clearly depicted. As illustrated, one or more latch brackets 600 may be disposed along an internal surface 602 of the door frame 108. Any suitable number of latch brackets 600 may be used to secure the door 102 to the door frame 108. As illustrated, there may be at least one latch bracket 600 disposed on each side of the door frame 108. Each latch bracket 600 may be uniformly or evenly spaced between each other.

Figure 7A:
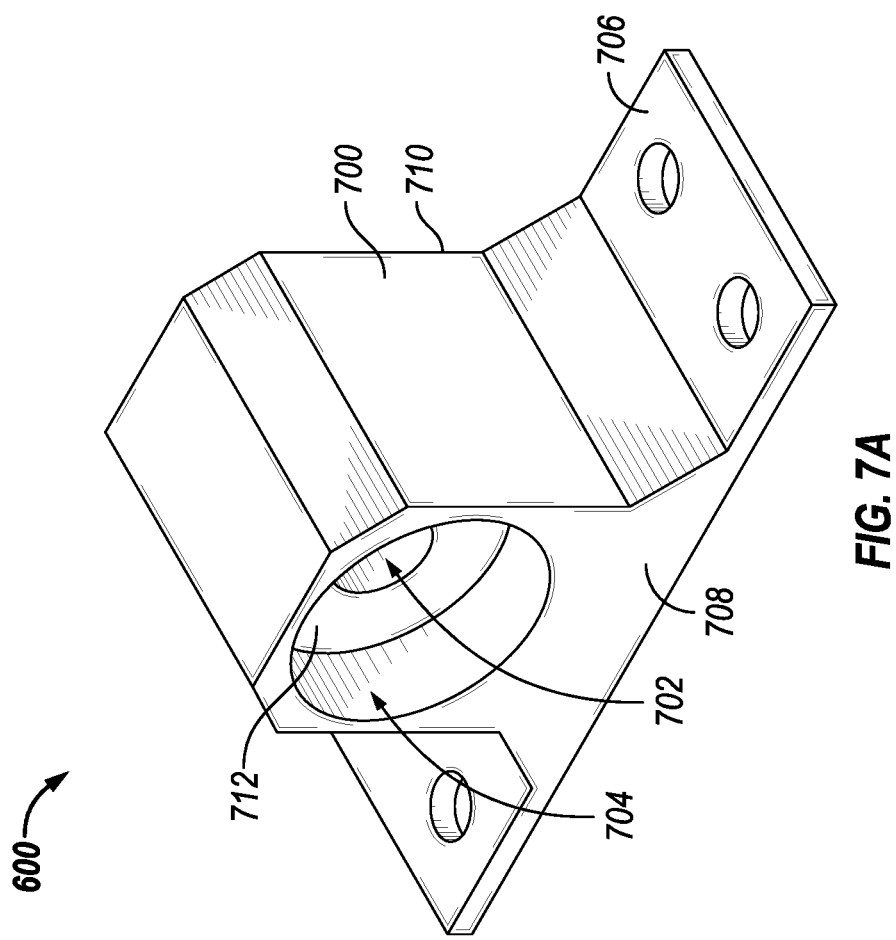

FIGS. 7A and 7B illustrate an example of one latch bracket 600, in accordance with an embodiment of the present disclosure. FIG. 7A illustrates an isometric view of the latch bracket 600, and FIG. 7B illustrates a cross-sectional view of the latch bracket 600. In embodiments, the latch bracket 600 may be any suitable size, height, shape, and combinations thereof. Without limitations, the latch bracket 600 may comprise any suitable material, such as metals, nonmetals, composites, polymers, ceramics, and any combinations thereof. As illustrated, the latch bracket 600 may comprise a housing 700, an engagement aperture 702, a recessed aperture 704, and a flange 706. The engagement aperture 702 may be disposed at least partially through the housing 700. The engagement aperture 702 may be operable to receive a suitable fastener, such as the bolt 204 (referring to FIG. 2), wherein the suitable fastener may be threadably engaged with the engagement aperture 702. In one or more embodiments, the engagement aperture 702 may comprise threads operable to secure and retain a suitable fastener received by the engagement aperture 702.

As illustrated, the recessed aperture 704 may be disposed at a front surface 708 of the housing 700, wherein the engagement aperture 702 may be disposed adjacent to the recessed aperture 704 and may extend further into the housing 700 towards a back surface 710 of the housing 700. While the presently illustrated embodiment shows the engagement aperture 702 not fully extending through the housing 700, in other embodiments, the engagement aperture 702 may extend through the housing 700. The recessed aperture 704 may be an opening disposed within the housing 700 and may provide further access to the engagement aperture 702, which may further be an opening. The recessed aperture 704 may be operable to receive a suitable fastener, such as the retainer washer 206 (referring to FIG. 2). In one or more embodiments, the recessed aperture 704 may be in the shape of the fastener to be received by the recessed aperture 704. For example, the recessed aperture 704 may comprise a circular cross-sectional shape. Further, the engagement aperture 702 may be in the shape of the fastener to be received by the engagement aperture 702. In examples, the diameter of the recessed aperture 704 may be greater than the diameter of the engagement aperture 702. During operations, as the retainer washer 206 may be disposed around the bolt 204, the bolt 204 may be threadably coupled into the engagement aperture 702 for a length of up until the location of the retainer washer 206. In embodiments, the diameter of the engagement aperture 702 may be less than the diameter of the retainer washer 206. The bolt 204 may be actuated to rotate into the engagement aperture 702 up until the retainer washer 206 abuts a shoulder 712 within the recessed aperture 704.

As shown in FIGS. 7A-7B, the latch bracket 600 may comprise the flange 706. The flange 706 may be coupled to the housing 700 and may be operable to secure the latch bracket 600 to the internal surface 602 (referring to FIG. 6) of the door frame 108 (referring to FIG. 6). In embodiments, the flange 706 may comprise one or more holes to be utilized to fasten the latch bracket 600 to the door frame 108. The flange 706 may be any suitable size, height, shape, or combinations thereof. As illustrated, the flange 706 may be disposed on both sides of the housing 700. While illustrated as disposed on both sides of the housing 700, the flange 706 may be disposed about any suitable location in relation to the housing 700.

Figure 8A:
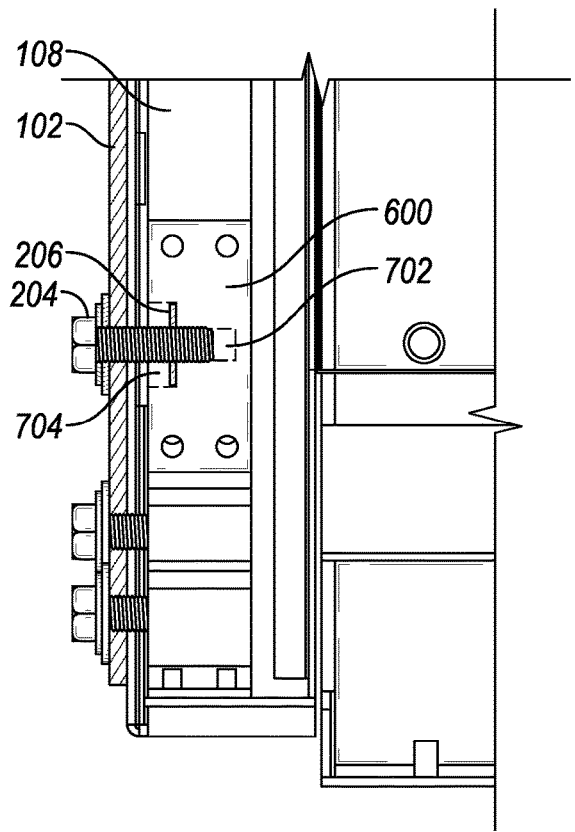
FIGS. 8A and 8B are views of a set of fasteners in use with the latch bracket of FIGS. 7A-7B, in accordance with an embodiment of the present disclosure.
Figure 8B:
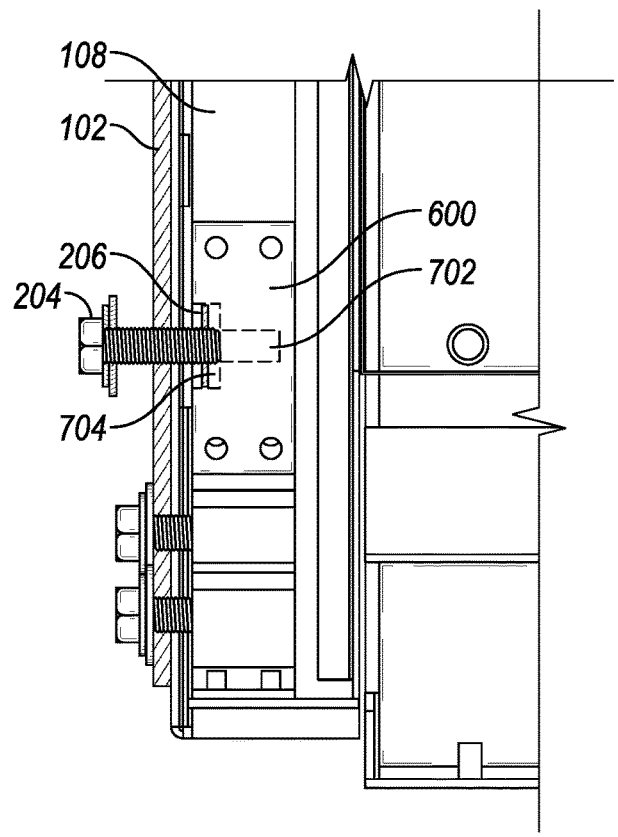

FIGS. 8A and 8B illustrate an example of one latch bracket 600 and the bolt 204 of one of the one or more sets of fasteners 200 (referring to FIG. 2), in accordance with an embodiment of the present disclosure. FIG. 8A illustrates a view of the bolt 204 in an engaged position with the latch bracket 600, and FIG. 8B illustrates a view of the bolt 204 in a disengaged position with the latch bracket 600. As illustrated, the bolt 204 may be disposed through the door 102, wherein the retainer washer 206 may be disposed around the bolt 204 about an interior side of the door 102, thereby securing the bolt 204 to the door 102. As the door 102 is closed against the door frame 108, the bolt 204 may be rotated to threadably couple with the engagement aperture 702 of the latch bracket 600. The bolt 204 may be at least partially inserted into the engagement aperture until the retainer washer 206 abuts the shoulder 712 (referring to FIGS. 7A-7B) of the recessed aperture 704. This may be the engaged position of the bolt 204 with the latch bracket 600. In embodiments wherein the door 102 is to be opened, the bolt 204 may be rotated to be removed from the engagement aperture 702. Once the bolt 204 is clear from the engagement aperture 702, the door 102 may be opened relative to the door frame 108. As the door 102 opens, the bolt 204 may be retained with the door 102 and may move with the door 102 as the retainer washer 206 secures the bolt 204 to the door 102.

Figure 9:
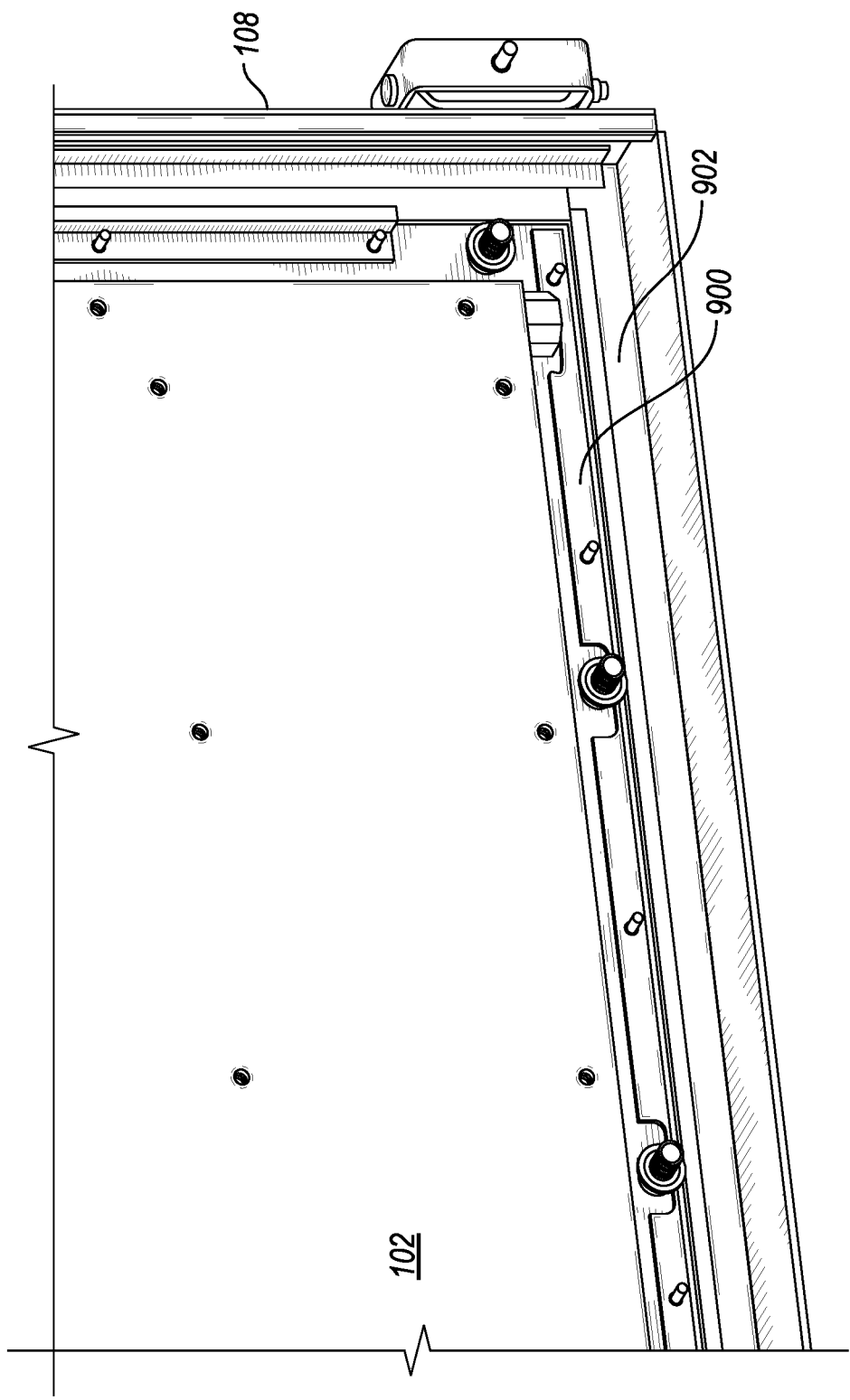
FIG. 9 is a partial view of a gasket clip, in accordance with an embodiment of the present disclosure.

FIG. 9 illustrates a gasket clip 900, in accordance with an embodiment of the present disclosure. The gasket clip 900 may be operable to secure a gasket 902 between the door 102 and the door frame 108. The gasket clip 900 may either be coupled to the door 102 or the door frame 108 through any suitable means, such as fasteners. The gasket clip 900 may be any suitable size, height, shape, and combinations thereof. In embodiments, there may be one or more gasket clips 900 disposed along or proximate a perimeter of the door 102 that aligns with the door frame 108. The gasket clip 900 may be operable to prevent the gasket 902 from being displaced when compressed between the door 102 and the door frame 108. As illustrated, the gasket 902 may include one or more strips of material that are applied along the perimeter edges of the door 102. The gasket 902 may be positioned along the edges of the door 102 that overlap with and will therefore come into direct contact with the door frame 108 when the door 102 is closed. The gasket 902 may be made from silicon, elastomer, neoprene, or other materials.

Although the present disclosure and its advantages have been described in detail, it should be understood that various changes, substitutions and alterations can be made herein without departing from the spirit and scope of the disclosure as defined by the following claims.

What is claimed is:

1. A power equipment cabinet, comprising:
  a door operable to provide access within the cabinet;

one or more sets of fasteners coupled to the door, wherein each of the one or more sets of fasteners comprises a bolt and a retainer washer; and one or more latch brackets disposed on an internal surface of a door frame of the cabinet operable to secure the door to the door frame, wherein each of the one or more latch brackets comprises:
a housing extending away from the internal surface of the door frame;
a flange coupled to the housing operable to secure each latch bracket to the door frame, wherein the flange is disposed perpendicular to a front surface of the housing;
an engagement aperture operable to receive the bolt; and
a recessed aperture operable to receive the retainer washer;
wherein the recessed aperture is disposed at the front surface of the housing and extends towards a back surface of the housing, wherein the engagement aperture is disposed adjacent to the recessed aperture opposite to the front surface of the housing and extends towards the back surface of the housing, and wherein the door is operable to sit flush against a contact surface when the recessed aperture receives the retainer washer, wherein the door is coupled to the door frame through at least one hinge coupling, wherein the at least one hinge coupling comprises a slotted hinge assembly having a first hinge component attached to an external surface of the door and a second hinge component attached to an external surface of the cabinet, wherein a rod extends through apertures defined in both the first hinge component and the second hinge component, wherein the apertures of one of the first hinge component or the second hinge component are non-circular.

2. The power equipment cabinet of claim 1, wherein the diameter of the recessed aperture is greater than the diameter of the engagement aperture.

3. The power equipment cabinet of claim 2, wherein each of the one or more latch brackets comprises a shoulder formed at the change in diameter between the recessed aperture and the engagement aperture, wherein each of the one or more sets of fasteners is in an engaged position when the retainer washer abuts the shoulder.

4. The power equipment cabinet of claim 1, further comprising one or more gasket clips disposed along or proximate to a perimeter of the door that aligns with the door frame.

5. The power equipment cabinet of claim 4, further comprising a gasket disposed between the door and the door frame, wherein the one or more gasket clips is operable to prevent the gasket from being displaced when compressed between the door and the door frame.

6. The power equipment cabinet of claim 1, further comprising power components enclosed within the cabinet, wherein the door is operable to provide access to the power components.

7. The power equipment cabinet of claim 1, wherein the bolt is partially disposed through an aperture of the door, wherein the retainer washer is disposed around the bolt about an interior portion of the door, wherein the bolt is operable to be secured within the engagement aperture, and wherein the retainer washer is operable to be received by the recessed aperture.

8. The power equipment cabinet of claim 1, further comprising a plurality of doors coupled to the cabinet and operable to provide access within the cabinet.

9. A method, comprising:
receiving a fastener comprising a bolt and a retainer washer from a set of fasteners into a latch bracket disposed on an internal surface of a door frame of a cabinet in an engaged position, the latch bracket comprising:
a housing;
a flange coupled to the housing operable to secure the latch bracket to the door frame, wherein the flange is disposed perpendicular to a front surface of the housing;
an engagement aperture; and
a recessed aperture,
wherein the recessed aperture is disposed at the front surface of the housing and extends towards a back surface of the housing, wherein the engagement aperture is disposed adjacent to the recessed aperture opposite to the front surface of the housing and extends towards the back surface of the housing;
securing a door to the door frame via the fastener;
retaining the fastener to the door via the set of fasteners attached to the door during a disengaged position;
receiving a retainer washer in the recessed aperture during an engaged position, wherein the retainer washer is disposed around the bolt about an interior portion of the door, and wherein the door is operable to sit flush against a contact surface when the recessed aperture receives the retainer washer; and
rotating the door about one or more hinges disposed at a first side of the door, wherein each of the one or more hinges is a slotted hinge assembly having a first hinge component attached to an external surface of the door and a second hinge component attached to an external surface of the cabinet, wherein a rod extends through apertures defined in both the first hinge component and the second hinge component, wherein the apertures of one of the first hinge component or the second hinge component are non-circular.

10. The method of claim 9, further comprising rotating the bolt to secure the bolt within the engagement aperture.

11. The method of claim 10, further comprising receiving, by a shoulder formed by a change in diameter between the recessed aperture and the engagement aperture, the retainer washer as the bolt rotates.

12. The method of claim 9, further comprising rotating the bolt in an opposite direction to remove the bolt from the engagement aperture.

13. The method of claim 9, further comprising compressing a gasket disposed between the door and the door frame via one or more gasket clips as the door is secured to the door frame.

14. The method of claim 9, further comprising translating the one or more hinges in an inward direction with respect to the door as the set of fasteners is tightened to secure the door against the door frame.

* * * * *